US008624781B2

(12) United States Patent
Christensen et al.

(10) Patent No.: US 8,624,781 B2
(45) Date of Patent: Jan. 7, 2014

(54) SYSTEM AND PROCESS FOR DISPLAYING A TARGET

(75) Inventors: Jan Christensen, Karlskoga (SE); Peter Freij, Linkoping (SE); Jyri Viuhko, Karlskoga (SE); Johan Gunnarsson, Arboga (SE)

(73) Assignee: Bae Systems Bofors AB, Karlskoga (SE)

( * ) Notice: Subject to any disclaimer, the term of this patent is extended or adjusted under 35 U.S.C. 154(b) by 1113 days.

(21) Appl. No.: 11/921,046

(22) PCT Filed: May 24, 2006

(86) PCT No.: PCT/SE2006/050158
§ 371 (c)(1),
(2), (4) Date: Feb. 17, 2009

(87) PCT Pub. No.: WO2006/126966
PCT Pub. Date: Nov. 30, 2006

(65) Prior Publication Data
US 2009/0184870 A1 Jul. 23, 2009

(30) Foreign Application Priority Data

May 25, 2005 (SE) ...................................... 0501176

(51) Int. Cl.
*G01S 3/02* (2006.01)
(52) U.S. Cl.
USPC ........ 342/450; 342/118; 342/147; 342/357.2; 709/200; 348/116
(58) Field of Classification Search
USPC ........................... 342/62, 118, 139, 146, 147, 342/357.2–357.78, 450; 348/116; 709/200
See application file for complete search history.

(56) References Cited

U.S. PATENT DOCUMENTS

| 4,741,245 A | | 5/1988 | Malone |
| 4,949,089 A | * | 8/1990 | Ruszkowski, Jr. ............... 342/52 |
| 5,280,744 A | | 1/1994 | DeCarlo |
| 5,344,105 A | * | 9/1994 | Youhanaie .................... 244/3.14 |
| 5,351,059 A | * | 9/1994 | Tsuyuki ........................ 342/457 |
| 5,471,213 A | | 11/1995 | Hergesheimer |
| 5,568,152 A | * | 10/1996 | Janky et al. ............... 342/357.68 |

(Continued)

FOREIGN PATENT DOCUMENTS

| EP | 0327029 A | 8/1989 |
| EP | 0359950 A2 | 3/1990 |

(Continued)

OTHER PUBLICATIONS

PCT/ISA/210—International Search Report—Jul. 17, 2007.

*Primary Examiner* — El Hadji Sall
(74) *Attorney, Agent, or Firm* — Venable LLP; Eric J. Franklin (57) ABSTRACT

A system suitable for displaying a target. A first unit is arranged to generate a first information unit including the target's position relative to a first position. The first information unit is arranged to transfer the first information unit to a second unit existing at a second position which is separate from the first position. The second unit is arranged to generate a second information unit including the target's position relative to the second position, depending on the first information unit. The second unit is arranged to indicate the target's position to allow localization of the target.

3 Claims, 6 Drawing Sheets

(56) References Cited

U.S. PATENT DOCUMENTS

| | | | |
|---|---|---|---|
| 5,672,840 A | 9/1997 | Sage et al. | |
| 5,686,924 A * | 11/1997 | Trimble et al. | 342/357.31 |
| 6,114,975 A * | 9/2000 | Guillard | 340/945 |
| 6,750,806 B2 * | 6/2004 | Fischer | 342/96 |
| 7,453,395 B2 * | 11/2008 | Thomas et al. | 342/357.34 |
| 2003/0008671 A1 * | 1/2003 | Lundgren et al. | 455/456 |
| 2004/0061641 A1 * | 4/2004 | Fischer | 342/96 |

FOREIGN PATENT DOCUMENTS

| | | |
|---|---|---|
| EP | 0629832 A1 | 12/1994 |
| EP | 0852326 A1 | 7/1998 |
| EP | 0977003 A | 2/2000 |
| EP | 1450125 A | 8/2004 |
| EP | 1688697 A | 8/2006 |
| WO | WO-94/01739 A | 1/1994 |
| WO | WO-98/12572 A | 3/1998 |

\* cited by examiner

SYSTEM AND PROCESS FOR DISPLAYING A TARGET

TECHNICAL FIELD

The present invention relates to a system suitable for displaying a target as well as a combat guidance system comprising a central unit for handling information. The present invention relates also to a device and process for displaying a target, e.g., an enemy unit.

The present invention relates even to a device, a system and a process to generate a northerly direction.

The present invention relates even to a software combat guidance, displaying a target and fighting a target.

The invention even relates to a process, device, system and software for fighting a target and/or documentation of performance.

KNOWN TECHNOLOGY

In U.S. Pat. No. 5,568,152 a device and a process for determining a target's position by an observer is described.

In conflicts between military units, participating soldiers and officers are often under pressure and emotionally affected because of the existing conditions. Performing difficult assignments during conflict and analyzing under time pressure is exhausting for many involved.

A considerable amount of information is communicated between fighting units and even with advanced technical equipment it is difficult to extract essential information from a high flow of information.

Today there are systems for determining an enemy unit's position. Position determination and threat identification are important parameters in the threat assessment which e.g. a combat command performs. The threat assessment can result in a threat prioritization, which can provide the base for the fight tactics and fighting strategy which can provide the base for the fight tactics and fighting strategy which is implemented.

Data regarding target displaying and target following is often communicated in real time. This puts extra high demands on units involved to effectively be able to fight an enemy unit. Even achievement documentation is important so that a combat command can have a good overview of the fight, both with regard to fighting enemy units and status for units within their own military unit.

Today a number of different systems are used separately to display targets, direct fighting and register target information. For example, there are laser distance measurers, binoculars with compass, positioning systems, guidance systems, etc., which are usually handled by specially-trained personnel.

None of the existing systems integrates said benefits and functions to one system for a single soldier.

SUMMARY OF THE INVENTION

One goal of the present invention relates to the problem of integrating existing functions and systems to a portable system which can easily be handled by a single solder during combat.

A goal of the present invention relates to the problem of increasing the effectiveness of combat units.

Another goal of the present invention relates to the problem with overly slow chains of command during different types of fighting situations where there is a need for military personnel to be able to consistently deliver more accurate effective fire with high precision.

A further goal of the present invention relates to the problem with reducing the weight borne by members of a military unit.

A further goal of the present invention relates to the problem with reducing stress in a combat situation.

These problems are solved by a system suitable for displaying a target, comprising: a first unit arranged to generate a first information unit comprising the target's position relative to a first position, wherein the first information unit is arranged to transfer said first information unit to a second unit existing at a second position which is separate from the first position; wherein the second unit is arranged to generate a second information unit, comprising the target's position relative to the second position, depending on the first information unit; wherein the second unit is arranged to indicate the target's position to allow localization of the target.

According to an embodiment of the invention a soldier or a vehicle, such as, e.g., a tank, is equipped with an organ which is arranged to determine a position for an enemy unit, and to transfer information, comprising target coordinates and other relevant information on the enemy unit, to another unit, e.g., a soldier or a vehicle, such as e.g. a tank, within the unit which with help of the transferred target coordinates, by means of a display device, can quickly and easily localize the enemy unit and fight it.

The position for the enemy unit can be determined with a laser type distance measurer, or with help of radio waves, and an organ for angle measuring, e.g., a gyro. The position is advantageously determined relative to the first unit's position, where the first unit can be a soldier or a vehicle, such as, e.g., a tank, which can be received with help of, e.g., GPS (Global Positioning System). The angle to the enemy unit is given relative to a generated northerly direction which is a north reference. The northerly direction can be generated with a process using phase frequency analysis of radio waves sent out from a central unit.

The soldier or personnel in a vehicle, such as, e.g., a tank, can, in connection with the positioning of the enemy unit, for example, with the voice, create information units which contain information on the enemy unit which allows identification of the same. Information which comprises the enemy unit's position and appurtenant information units can be stored in a central unit which is arranged to communicate with the units within the military unit. The information that comprises the enemy unit's position and related information can directly, upon request or distribution, be forwarded from the soldier or the vehicle, such as, e.g., a tank, to another unit within the military unit which has the capacity and possibility to fight the target. Alternatively, the information which comprises the enemy unit's position and related information can be forwarded via the central unit, upon request or distribution, to another unit within the military unit which has the capacity and possibility to fight the target.

With the invention the advantage of reducing the amount of data which is communicated within a unit is achieved. Advantageously, a fighting unit can use target coordinates which another unit has generated in a simple and reliable way, e.g., voice command. As a synergistic effect, increased capability for units within a military unit to cooperate and maximally utilize existing resources during battle is obtained. The simple use and handling of vital information within the military unit reduces stress for both commanding officers and soldiers.

As a surprising effect, an adaptive effect with a military unit within which the invention is realized without introducing further units is achieved. Existing units can be better used with the possibility to register and convey vital information to battle allies and the command hierarchy. This means that, e.g., heavier weapons systems within the military unit can be used fully with less risk to one's own dismounted troops or other units within the military unit. That is, the protection level is increased for, among others, individual soldiers.

According to one aspect of the invention a target can be effectively allocated within the military unit. A recording that an enemy target is chosen by a unit for fighting makes it possible for other units to be able to choose and register other enemy units as targets, which minimises the risk that a number of units within the military unit fight the same target at the same time.

However, it should be noted that in certain situations it is not desirable that a number of units within the military unit fight the same target at the same time. According to the invention this can be performed in a controlled way.

As a positive effect a mutual, more accurate, picture of the situation can be obtained within the military unit. As a further result it is possible for units within the military unit to more quickly be able to act from the right place at the right time. Improved and situation-tailored work is achieved through the simple handling of vital information.

Advantageously, an increased ability to fight in darkness is achieved. Night time battle has been associated with various difficulties for a long time, and places high requirements on personnel and equipment. According to an embodiment of the invention, fighting a target can be performed with a simple displaying process even in darkness where the target does not even need to be visible to the bighting unit.

According to a preferred embodiment trajectory correction of ammunition is used all the way to the moment of contact. This is a very effective way to fight moving targets. That is, according to one embodiment, the invention can allow improved precision of displaying for search- and fight systems, such as, e.g., artillery systems or missile systems, and for fighter aircraft.

According to the invention a quick and certain identification of one's own units and third persons is made possible. Furthermore, quick and certain identification of one's own and enemy units is made possible. In a stressful combat situation, according to the invention a compromised and minimized amount of communicated information can effectively reduce injuries for third persons, at the same time as achieving an increased efficacy or quicker weapon performance with a certain weapon type for the target in question.

According to an aspect of the invention the need for power can be reduced. Fewer power sources, e.g., batteries, results in a lower borne weight for soldiers. As a consequence there is greater stamina, both physical and mental stamina, as well as a longer stamina over time. Alternatively, reducer power needs also result in a reduced need for maintenance within the military unit and therewith reduced workload for different maintenance functions.

As a positive effect the military unit can, during training, reduce costs in connection with the increase of precision fighting of targets. This can resultantly reduce costs for a military unit's training time. According to the invention, a better assessment after military unit exercises can then be achieved with a logging function which can be used to analyze different periods during the exercise.

According to an aspect of the invention the first information unit comprises information on type of target or name of the target for simple identification.

According to an aspect of the invention the second unit is arranged to visually indicate a direction toward the target.

According to an aspect of the invention, the first unit is arranged to generate at least a part of the first information by means of voice command.

According to an aspect of the invention the first unit is arranged to generate at least a part of the first information by means of phase analysis and generation of a northerly reference.

It is a further goal of the present invention to allow localization and aiming of a weapon for fighting a target by indicating a target position.

This problem is further solved by providing a device to generate a northerly direction, comprising a weapon provided with a computer unit as well as a first and a second receiving unit. The device is characterised in that the first and the second receiving units are arranged at a distance relative to one another and are arranged to receive radio waves sent out from a central unit and, depending upon these, send signals to the computer unit. The computer unit is arranged to receive signals from the first and second receiving units as well as arranged to handle the received signals to generate a northerly direction.

The angle to the enemy unit is provided relative to the generated northerly direction which is a north reference. The northerly direction can be generated with a process using phase frequency analysis of radio waves sent out from the central unit.

According to an aspect of the invention the device's first and second receiving units are arranged to register a first time point when a certain part of a radio wave is detected and a second time point when the same part of the radio wave is detected, respectively. According to an embodiment of the invention the computer unit is arranged to store a value representing the northerly direction I a memory provided therein.

According to an embodiment of the invention the computer unit is arranged to determine a target's position depending upon the generated northerly direction.

According to an embodiment of the invention the computer unit is arranged to determine an angle to a target relative to the northerly direction.

According to an embodiment of the invention the device is arranged so that the distance between the first and the second receiving unit is between 10 and 20 cm.

The problem is further solved through a system for generating a northerly direction, comprising a central unit as well as a device according to the above, where the device comprises a weapon provided with a computer unit as well as a first and second receiving unit. The system is characterised in that the central unit is arranged to send out radio waves, the device's first and second receiving units are arranged at a distance relative to one another and are arranged to receive radio waves sent out from a central unit and, depending upon these, send signals to the device's computer unit, the device's computer unit is arranged to receive signals from the device's first and second receiving units as well as arranged to handle the received signals to generate a northerly direction.

According to an aspect of the invention the system is arranged with the device's first and second receiving units arranged to register a first time point when a certain part of a radio wave is detected and a second time point when the same part of the radio wave is detected, respectively.

An embodiment of the invention is a system, where the device's computer unit is arranged to store a value representing the northerly direction in a memory provided therein.

An embodiment of the invention is a system, where the device's computer unit is arranged to determine a target's position depending upon the generated northerly direction.

An embodiment of the invention is a system, where the device's computer unit is arranged to determine an angle to a target relative to the northerly direction.

According to an embodiment of the invention the system is arranged so that the distance between the device's first and second receiving units is between 10 and 20 cm.

The problem is further solved through a process to generate a northerly direction, comprising the step of: registering a direction to a radio wave source, registering a first time point when a certain part of a radio wave is detected, registering a second time point when the same part of the radio wave is detected as well as generate a northerly direction depending upon said first and second time points as well as the registered direction. The northerly direction is used in a displaying process, comprising the steps of: calculate a target position relative to the generated northerly direction and indicate the target position, for allowing localization and aiming of a weapon for fighting the target.

The problem is further solved through a process to localize and aim a weapon, comprising the steps of: generate a northerly direction according to the steps register a direction to a radio wave source, register a first time point when a certain part of a radio wave is detected, register a second time point when the same part of the radio wave is detected as well as generate a northerly direction depending on said first and second time points as well as the registered direction, calculate a target position relative to the generated northerly direction, indicate the target position to allow localization and aiming of a weapon for fighting the target.

According to an aspect of the invention is the process so that the registered direction remains relative to a central unit's generated northerly direction reference with an angle.

According to an embodiment a computer program product is used comprising program code for performing the previously-named process steps, when said computer program is executed on a computer unit arranged in the weapon.

According to an embodiment a computer program product is used comprising program code stored on one computer readable medium, which program code is arranged to perform the previously-named program steps, when said computer program is executed on a computer unit.

According to an aspect of the invention the second unit is arranged to fight the target after localization.

DETAILED DESCRIPTION OF THE DRAWINGS

Figure 1A:
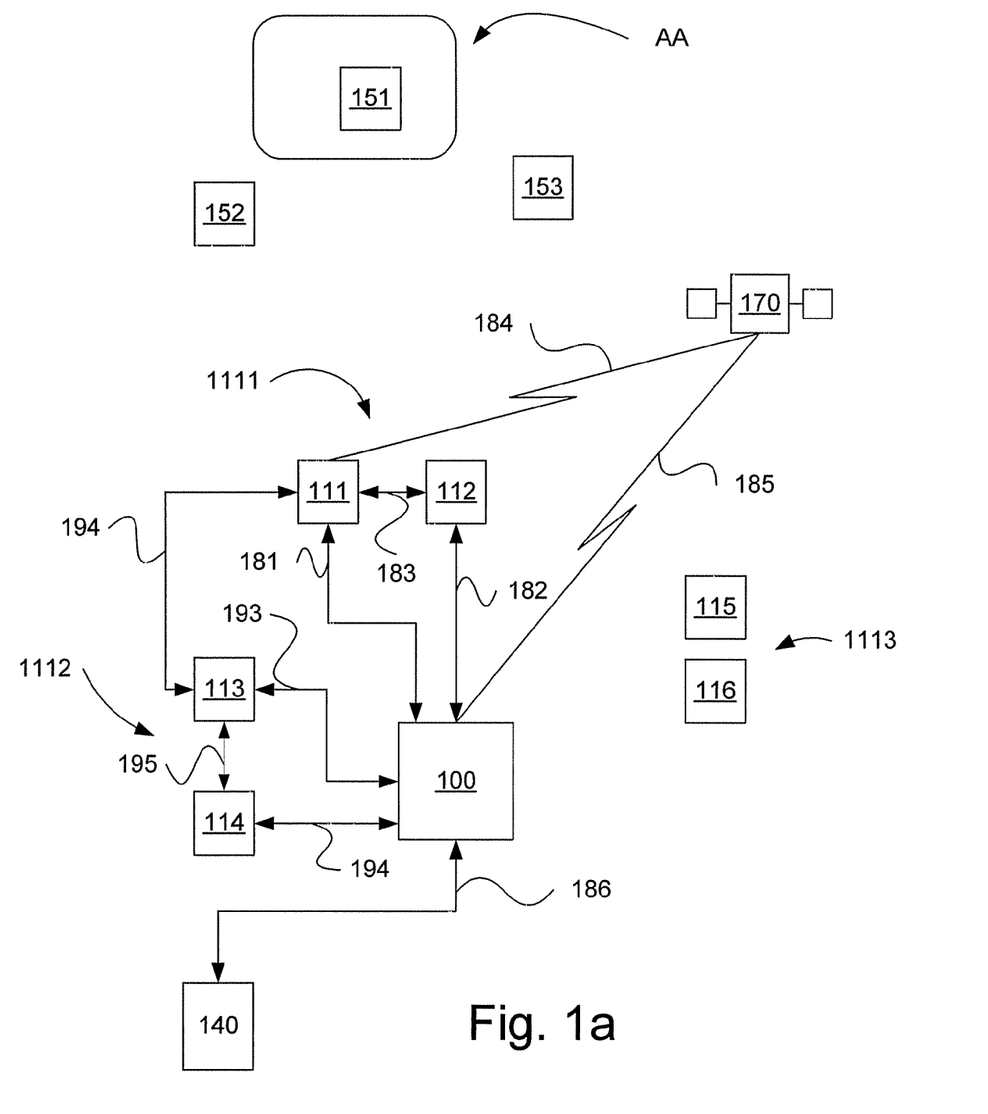
FIG. 1a schematically shows a military unit and a system related thereto for combat guidance according to an embodiment of the invention.

FIG. 1a shows an over view of a region, such as a combat region, in which region different units are positioned. Three enemy units are illustrated with reference numerals 151, 152 and 153. Units that are shown in FIG. 1, except for the units 151, 152 and 153, constitute a military unit. The units can be mobile. A central unit 100 is arranged to communication with a first unit 111 and a second unit 112, via a first link 181 and a second ling 182, respectively. The first and second units form a first combat pair 1111. Furthermore, the first and second units 111 and 112 are arranged for communication with each other via a link 183.

Herein the term link relates to a link which is wireless, e.g., a radio link. Alternatively a link can be a physical connection, such as a fibre optic cable. Alternatively a link can be an ultrasound link.

According to an embodiment the central unit 100 is a combat command central. According to a realization the central unit 100 is an armoured vehicle comprising equipment necessary for communicating with units within the military unit as well as to lead them. According to a preferred realization the central unit is a vehicle arranged to transport seated ground troops, e.g., three or four combat pairs (6 or 8 soldiers).

According to a preferred embodiment the central unit is a vehicle arranged to transport seated troops, e.g., three or four combat pairs (6 or 8 soldiers).

The equipment can, e.g., include senders and receivers as well as computers with software. One or a few operators can work at the same time with combat guidance, that is, coordination of efforts for units within the military unit. According to a realization the central unit can lead a combat unit or a certain size or a certain number of soldiers, such as, e.g., a platoon or a battalion. Alternatively the central unit 100 is arranged to lead large formations, such as battalions.

Alternatively the central unit 100 is arranged to function only as information handler. In this case units within the military unit are not controlled by personnel at the central unit, but rather only exchange information via the central unit 100. Units within the military unit can therefore, according to an aspect of the invention, react autonomously with help of the central unit 100.

The central unit 100 is arranged for communication with a positioning system 170, e.g., GPS, via a link 185. Differential positioning can be used. Further, the central unit is arranged to generate a northerly direction of very good precision. The northerly direction generated by the central unit 100 is even called north reference. The central unit 100 is arranged to continually update information on its position (longitude, latitude, and altitude) as well as update the north reference.

It should be noted that a local coordinate system can be used within the fighting military unit.

The central unit 100 is arranged for communication with a third unit 113 and a fourth unit 114, via a third link 193 and a fourth link 194, respectively. The third and fourth units create a second fighting pair 1112. Further, the third and fourth units 113 and 114 are arranged for communication with each other via a link 195.

In a similar way the central unit 100 is arranged for communication with a third combat pair 1113 in which combat pair a fifth unit 115 and a sixth unit 116 are included. It should be noted that the number of units which are included in a military unit, and which can communicate with the central unit, is elective. According to an embodiment the central unit 100 creates a group including a driver and an operator (combat guider) as well as the three combat pairs 1111, 1112, and 1113.

It should even be noted that a military unit can consist of one or a number of central units, which can increase reliability regarding access to data stored in the central unit.

The central unit 100 is further arranged for communication with a unit 140 via a link 186. The unit 140 is an artillery group. Alternatively, the unit 140 can be a mechanized vehicle, e.g., a tank, or a robot system or an airplane, such as an attack plane. According to an embodiment the unit 140 is arranged to be able to give effective fire toward the enemy units 151, 152, and 153. The effective fire is according to an embodiment more powerful that what could be given from one of the combat pairs 1111, 1112, or 1113, which means that a unit within the combat pair can enable the unit 140 to fight a registered target with necessary resources, e.g., a robot system. According to an embodiment the unit 140 is arranged to be able to give effective fire in a region AA, within which the enemy unit 152 is placed.

The enemy units 151, 152, and 153 are a single soldier, an armoured vehicle, and a building, respectively. Naturally, enemy units can be comprised of other types of units, such as, e.g., airplanes, artillery positions, boats, cargo vehicles, troop vehicles, etc.

The first, second, third, fourth, fifth and sixth units are even assigned to the first, second, third, fourth, fifth and sixth combat units, respectively. This will be described in further detail with reference to FIG. 1*b*, below.

According to an embodiment the first unit 111 is a single soldier with appurtenant equipment. According to another embodiment the first unit is a motor-driven vehicle which can be driven by, e.g., a single soldier. The first unit 111 is arranged for communication with the positioning system 170 via a link 184.

Figure 1B:
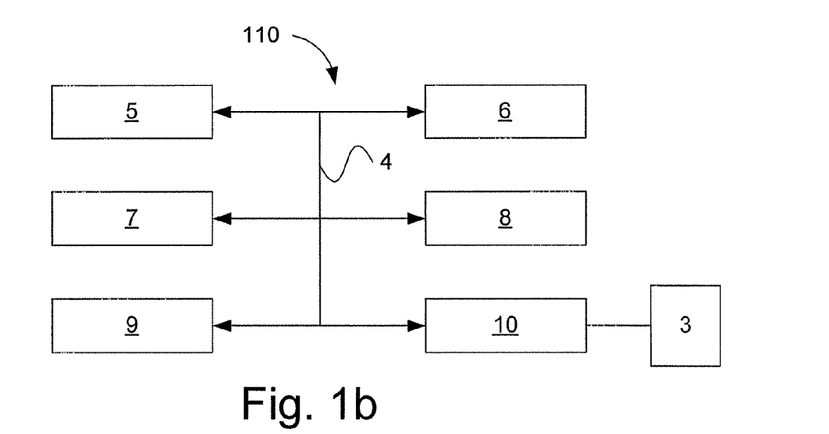
FIG. 1b schematically shows equipment units provided with a fighting unit according to an embodiment of the present invention.

FIG. 1*b* schematically shows equipment units within a combat unit. According to this example the equipment units are intended to be carried by a single soldier 110. The equipment units are coupled together via a link system 4 and comprise the basic borne equipment for the soldier.

A headset 5 comprises hearing protection and earphones with microphone. An antenna module 6 is provided with one or a few antennas, and electronics as well as software provided therefore, for communication with among others GPS 170.

The basic equipment even comprises a control module 7 which is described in further detail with reference to FIG. 1*c*. A sighting module 8 is removably fastened to a weapon 410. The sighting module 8 and the weapon 410 are described in further detail with reference to FIGS. 1*d* and 1*e*. A group radio 9 is presently arranged for communication with the second unit 112, alternatively one of the units in the second or third combat pair, or with other units within the military unit.

A computer unit 10 is arranged to receive information from the other equipment units. The computer unit 10 is arranged to send information to the other equipment units. The computer unit 10 is arranged to store information received from the other equipment units. The computer unit 10 is arranged to handle information received from the other equipment units. The computer unit is described in further detail with reference to FIG. 7.

The equipment units 5-10 are arranged to be powered by a power supply 3. Alternatively, the different equipment units are each equipped with their own power supply.

Figure 1C:
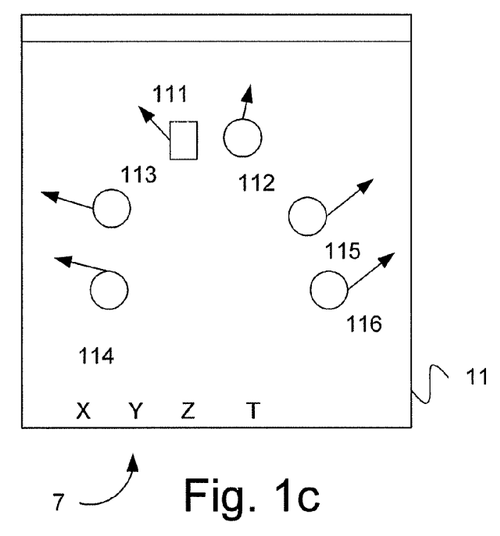
FIG. 1c schematically shows in further detail a control module according to an embodiment of the invention.

FIG. 1*c* schematically illustrates the control module 7 in further detail. The control module is considered to be included in the basic equipment borne by the soldier who comprises a part of the first unit 111. The control module 7 has a visual interface 11, as well as a screen or display. According to an embodiment the interface 11 is a touch sensitive screen. According to an embodiment the screen is black/white or colour.

The interface 11 is arranged to show relevant information for the soldier. Information which can be shown is, e.g., positions for units within the military unit, own position as well as enemy unit's positions. The own position can even be indicated with help of coordinates X, Y, and Z. Further, according to an embodiment each individual unit's respective weapon bearing can be shown. The own position is illustrated in the figure with a rectangle, and other units are illustrated with circles. The respective unit's weapon bearings are illustrated with arrows.

Updating of information can occur with the soldier's voice. Updating of information can occur in real time and be automatically transferred to the central unit 100 and therein be available for all units within the military unit.

Different modes for the control unit, such as Map, Order, Radio, can be selected. Further, the control units is arranged to show northerly direction, system time T (that is, a reference time within the military unit), distance from direction to the central unit 100 as well as status information on other units within the military unit, such as amount of remaining ammunition, fuel in the vehicle or blood pressure for individual soldiers.

Status for a unit within the military unit or enemy units can be shown with different symbols. Status can include information on e.g., amount of ammunition, health condition, or other.

Further, firing with the units within the military unit can be indicated with e.g., a symbol. That is, a soldier can see if another soldier within the military unit discharges their weapon(s). This information can be used as a basis for decision for each soldier. The decision can e.g., concern request of information (target coordinates) on a new target for fighting. Said request is sent to e.g., the central unit 100.

Figure 1D:
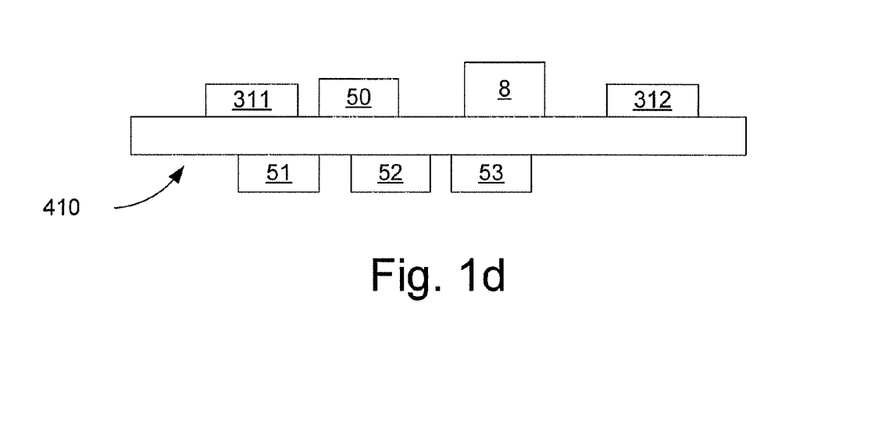
FIG. 1d schematically shows in further detail a weapon according to an embodiment of the invention.

FIG. 1*d* schematically shows in further detail a weapon which can be used by, e.g., the first unit 111.

According to an embodiment, the weapon 410 is an automatic carbine. The weapon 410 is provided with a first receiving unit 311 and a second receiving unit 312 exists arranged on the weapon 410 separated by a certain length L. According to an embodiment L is an interval between 10 and 20 cm.

The weapon 410 is provided with a distance meter 50. According to an embodiment the distance meter is arranged to measure distance by way of laser.

It should be apparent that the weapon 410 can of course be provided with a variety of additional equipment such as e.g., laser pointer 51, picture amplifier 52, or IR sight 53.

Figure 1E:
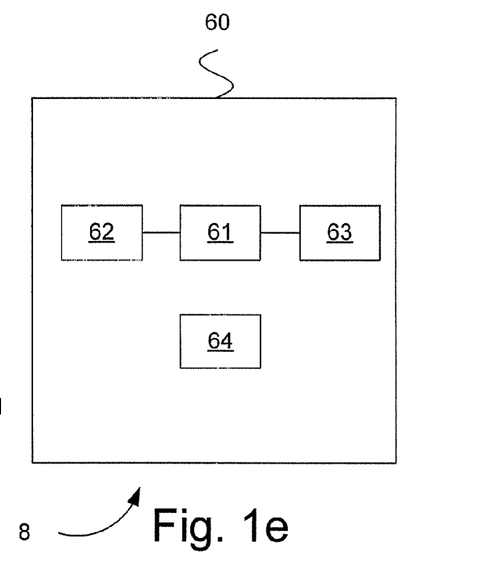
FIG. 1e schematically shows in further detail an aiming module according to an embodiment of the invention.

FIG. 1e illustrates the sighting module 8 in further detail according to an embodiment. A first electronic module 61 is arranged to generate a picture comprising complementary information, e.g., text. The electronic module 61 is arranged to receive a signal 390 from the first receiving unit 311. The electronic module 61 is arranged to receive a signal from the second receiving unit 312. The electronic module 61 is arranged to conduct a phase analysis depending upon the received signals 390 and 391.

The sighting module 8 is surrounded by a housing 60. According to an embodiment the sighting module 8 comprises a gyro 62 as well as two incline meters 63a and 63b. According to another embodiment the sighting module 8 comprises three gyros. The sighting module 8 is, as is known, arranged to generate information comprising the weapon's bearing in three dimensions and communicate this value to the computer unit 10. The computer unit 10 is arranged to send a signal 396 comprising information on the sighting module's 8 position, distance to target, angle to target from the sighting module 8, as well as complementary information to the central unit 100 where the content or the signal is stored. The stored information is accessible for units within the military unit. According to an embodiment the information is automatically sent to one or many units within the military unit.

The sighting module 8 comprises a mirror reflex sight 499 which contains a mirroring element 64 arranged to reflect information shown by the electronic unit 61 in a predetermined way. The sighting module 8 is described in further detail with reference to FIG. 4a.

Figures 2A, 2B:
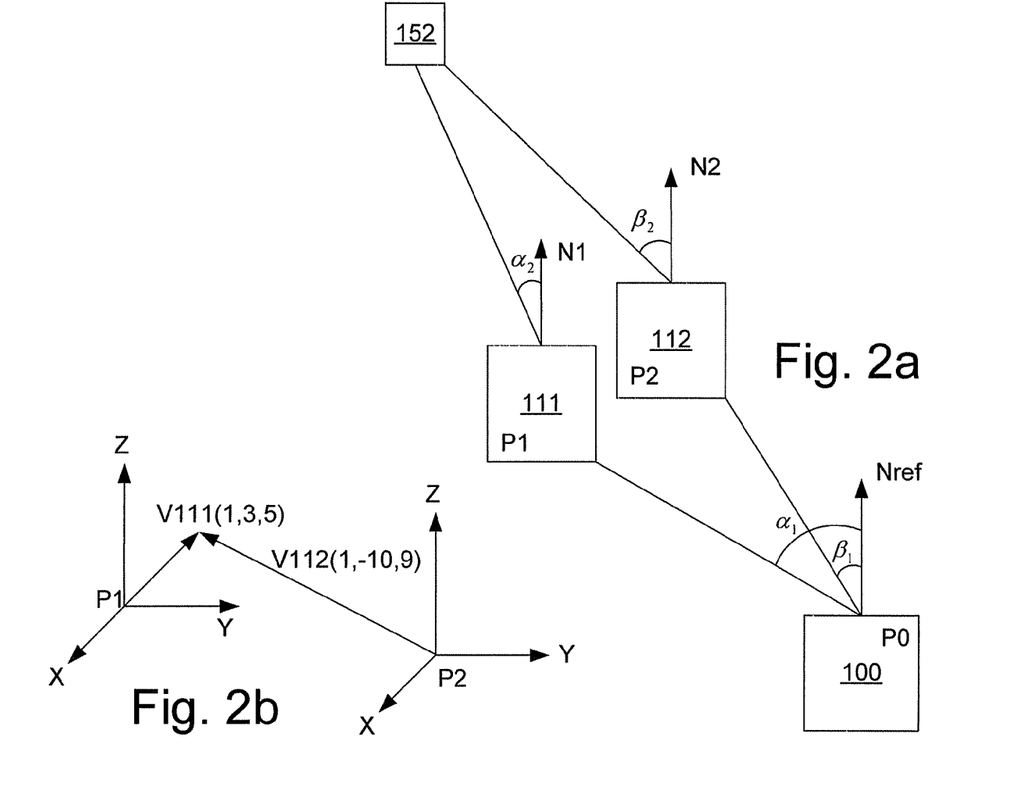
FIG. 2a schematically shows an overview of the first and second units and the central unit as well as their mutual angle dependence.
FIG. 2b schematically shows a way to indicate directions to a target from the first or second unit, respectively.

FIG. 2a schematically shows an overview of the target unit 152, the first combat unit 111, the second combat unit 112 as well as the central unit 100. In FIG. 2a, a mutual dependent angle between the respective units is evident.

The central unit 100 is placed at a position P0. P0 is known through use of GPS 170. The central unit is even provided with an organ for very precise indication of the compass points, such as e.g., an electric compass. The central unit 100 is arranged to generate a northerly reference Nref.

The first combat unit 111 is placed at a first position P1. The first combat unit is arranged to determine P1 by way of e.g., GPS 170. An angle $\alpha_1$ gives the angle between the central unit 100 and the first combat unit 111 relative to the northerly reference Nref. An angle $\beta_1$ gives the angle between the central unit 100 and the second combat unit 112 relative to the northerly reference Nref. An angle $\alpha_2$ represents the angle between the first combat unit 111 and the target unit 152 relative to a northerly direction N1, which northerly direction N1 is released from the first combat unit 111. An angle $\beta_2$ represents the angle between the second combat unit 112 and the target unit 152 relative to a northerly reference N2, which northerly reference N2 is released from the second combat unit 112. The angles $\alpha_1$, $\beta_1$, $\alpha_2$ and $\beta_2$ are solid angles which can be indicated in spherical coordinates according to an embodiment.

A device and a process to generate the northerly references N1 and N2 will be described with reference to FIG. 3.

FIG. 2b shows a vector V111 in a first coordinate system which has origin of coordinates in position P1, that is, the position which the first combat unit 111 is situated at. In the figure even a vector V112 is shown in a second coordinate system which has origin of coordinates in position P2, that is, the position where the second combat unit 112 is situated at. The vectors V111 and V112 point at the target 152 in agreement with what is evident in FIG. 2a. That is, V11 and V112 can be represented by $\alpha_2$ and $\beta_2$, respectively.

Figure 3:
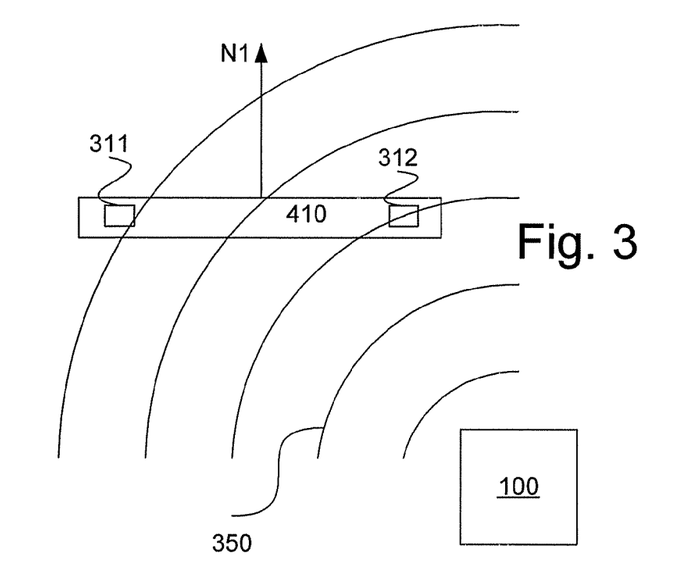
FIG. 3 schematically shows a way to generate a north reference according to an embodiment of the invention.

FIG. 3 schematically illustrates a device and a process for generating a northerly reference, according to an embodiment of the invention.

The central unit 100 is arranged to send out radio waves 350. With help of these radio waves 350 a phase analysis can be performed to generate a northerly reference, such as e.g., N1 and N2. The radio waves 350 have a certain frequency. The radio waves can be viewed as plane waves at a certain distance from the central unit 100. The first and the second receiving units are arranged to receive radio waves and depending upon these, send signals to the computer unit 10. The computer unit 10 is arranged to receive the signals from the first and second receiving units as well as to handle these to generate a northerly reference N1.

Depending on when the radio waves are received by the first and the second unit the northerly reference N1 can be calculated. The computer unit 10 is arranged to store a value representing the northerly reference N1 is a memory existing therein. The computer unit 10 is arranged to determine a target's position depending upon the generated northerly reference N1. N1 can be used as a northerly reference. The computer unit 10 is arranged to determine an angle to a target relative to N1.

Figure 4A:
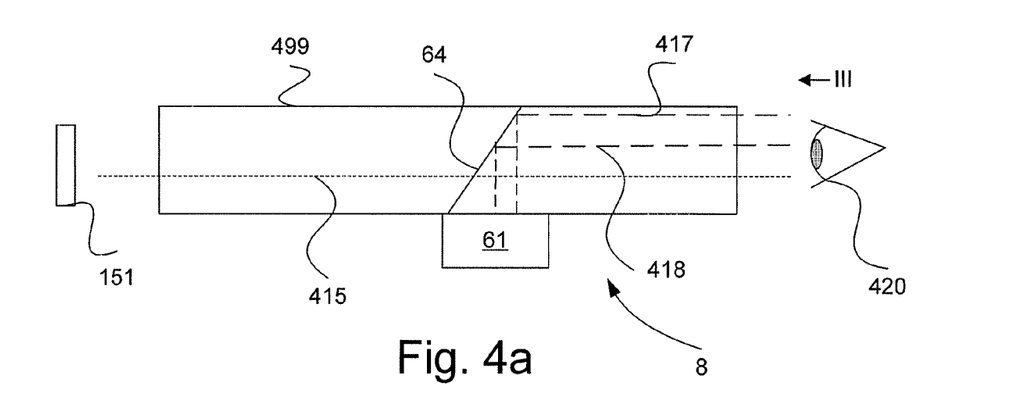
FIG. 4a schematically shows a cross section of a binocular sight with mirror reflex function.

FIG. 4a schematically illustrates a cross-section of the sighting module 8. The principle for a mirror reflex sight 499 is shown in the figure and is not going to be described in detail. The figure shows light rays 415 going through the sighting module 8. The light rays 415 represents a picture of the enemy unit 151. The light rays 415 can be detected by a user's eye 420. Electronic module 61 is arranged to generate a picture that is reflected against a mirror element 64. The generated picture comprises light rays 417 and 418. The generated picture can comprise adequate information, such as e.g., information in the form of text or symbols, even called complementary information.

Figure 4B:
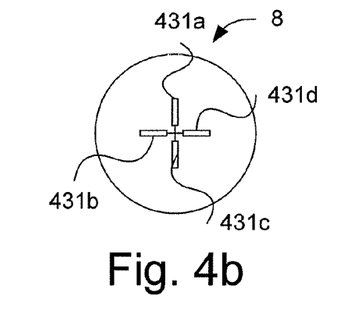
FIG. 4b-d schematically show views shown in a mirror reflex sight according to an embodiment of the invention.
Figure 4C:
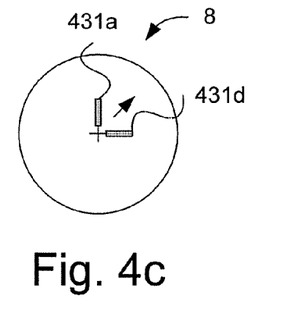
Figure 4D:
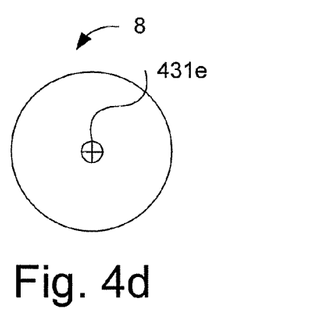

FIG. 4d schematically shows pictures generated in the mirror reflex sight 499 seen from the direction III shown in FIG. 4a according to an embodiment of the invention.

FIG. 4b shows a picture in the mirror reflex sight 499 at an initial time point. A marking consisting of four parts 431a-d is shown in the mirror reflex sight 499 as a picture by way of light rays 417. At this time point a displaying process is initiated.

FIG. 4c shows a picture in the mirror reflex sight 499 at a second time point. The markings are here updated and consist of the two parts 431a and 431d which are shown in the mirror reflex sight 499 as a picture by way of light rays 417. In this way it is indicated for a user that a target, such as e.g., the enemy unit 151, is in a direction that is indicated by an arrow, as shown in the figure. Electronic module 61 is arranged to update the picture that is shown in the mirror reflex sight 499 depending upon the weapon's direction and the target's position. According to an embodiment the picture is updated in real time. That is, a user can, through changing the weapon's direction toward a direction which is indicated by the marking, direct the weapon toward an enemy target in a fast, reliable and simple way.

FIG. 4c shows a picture in the mirror reflex sight 499 at a third time point. The user's weapon is at this time point directed toward the enemy unit 151. This is indicated with an updated picture in the form of a circle in the mirror reflex sight's 499 centre.

Figure 4E:
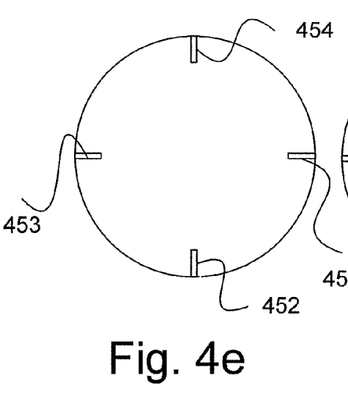
FIG. 4e-g schematically illustrate views generated by a mirror reflex sight according to an embodiment of the invention.
Figure 4F:
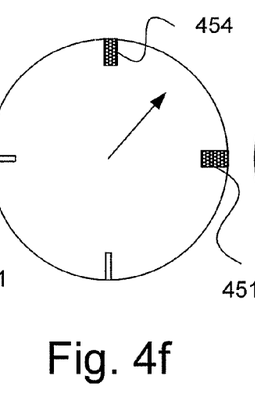
Figure 4G:
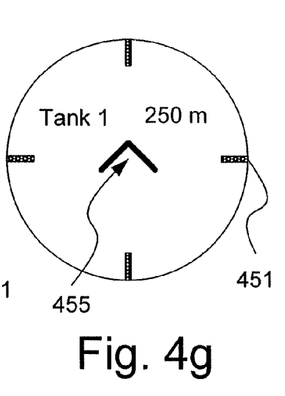

FIGS. 4e-g schematically illustrate pictures shown in the mirror reflex sight 499 according to an embodiment of the invention.

With reference to FIG. 4e a picture is shown in the mirror reflex sight 499 at an initial time point. A marking comprised of four parts 451-454 are shown in the mirror reflex sight 499 as a picture. At this time point a display process is initiated. The four parts 451-454 are shown in the picture's periphery with a mutually-equal distance which is shown in the FIG. 4e.

FIG. 4f shows an alternative picture in the mirror reflex sight 499 at a second time point with reference to FIG. 4c. The markings are here updated and are comprised of the two parts 451 and 454. In this way it is indicated for the used that a target, such as e.g., the enemy unit 151, is in a direction that is indicated with an arrow, such as that shown in the FIG. 4f. That is, the picture shown in the figure is a variant of the picture shown with reference to FIG. 4c.

With reference to FIG. 4f a picture is shown in the mirror reflex sight 499 at a third time point. The user's weapon is directed toward the enemy unit 151 at this time point. This is indicated with an updated picture in the form of a marking 455 in the mirror reflex sight's 499 centre. In addition, information such as the target's name is presented, in this case Tank 1. Further the distance to the target is presented, in this case 250 m.

According to an embodiment the direction toward the target is indicated with a marking when the weapon's bearing is in agreement with the direction to the target, that is, when the target in, e.g., day light is seen in the mirror reflex sight 499. According to another embodiment the direction toward the target is indicated when the weapon's bearing is such that effective fire toward the target is possible with discharge of the weapon. That is, this process works well even in darkness or when the target is not visible. The soldier only needs to direct the weapon so that an indication marks the direction to the target.

According to a process the weapon is arranged for automatic discharge when the weapon is directed toward the target.

According to an aspect of the invention a device is designed to indicate a target's position, wherein said device comprises:

organ arranged to, depending on a first information unit comprising the target's position relative to a first position, generate a second information unit comprising the target's position relative to a second position, wherein the first and second positions are different;

organ arranged to visually indicate the target's position in relation to the second position;

wherein the device is arranged to update in real time the indication of the target's position, depending upon a movement of the device relative to the target's position, to allow localization of the target.

Figures 5, 6A:
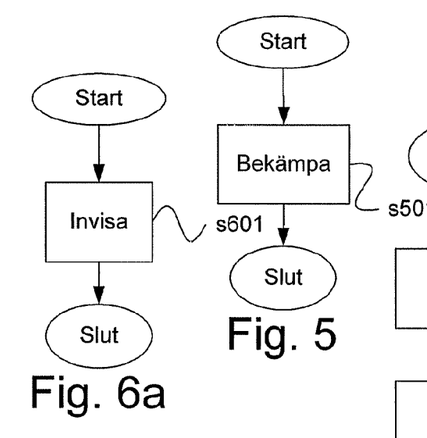
FIG. 5 shows a flow diagram which schematically illustrates a process for combat guidance according to an embodiment of the invention.
FIG. 6a shows a flow diagram which schematically illustrates a process for displaying an enemy target according to an embodiment of the invention.

FIG. 5 shows a flow diagram which schematically illustrates a process for fighting a target, according to an embodiment of the invention.

The process comprises process step s501 which comprise the steps of:

generate a first information unit comprising information on the unit's position relative a first position;
transfer said first information unit;
generate a second information unit comprising information on the unit's position, relative a second position, depending on the first information unit;
display the unit's position;
direct a device, designed for fighting of the unit, depending upon the display; and
fight the unit with the device.

FIG. 6a shows a flow chart which schematically illustrates a process for displaying a unit, e.g., an enemy target, according to an embodiment of the invention.

The process comprises process step s601 which comprise the steps of:

generate a first information unit comprising information on the unit's position relative a first position;
transfer said first information unit;
generate a second information unit comprising information on the unit's position, relative a second position, depending on the first information unit;
indicate the unit's position relative to the second position;
direct a device, e.g., a weapon, toward the unit's position, depending upon the second information unit; and
indicate that the directing is performed.

Preferably, the step s601 further comprises the steps of:
determine the first position;
determine a distance from the first position to the unit;
generate a northerly direction; and
determine the unit's position depending upon said generated northerly direction and the first position.

Preferably, the step s601 further comprises the steps of:
generate at least a part of the first information unit with voice command.

Preferably, the step s601 further comprises the steps of:
store said first information unit; and
transfer said first information unit depending upon a request.

After the process step s601 the process is concluded.

Figure 6B:
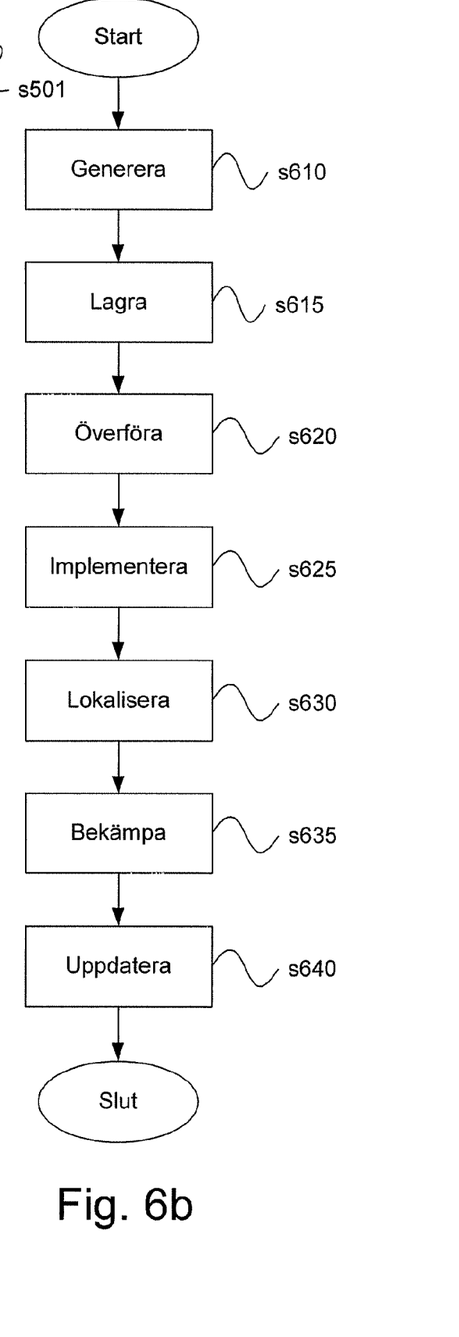
FIG. 6b shows a flow diagram which, in further detail, schematically illustrates a process for fighting targets according to an embodiment of the invention.

FIG. 6b shows a flow diagram which schematically illustrates in further detail a process for fighting a target according to an embodiment of the invention.

After starting the process step s610 is performed. In the process step s610 a first information unit INFO1 is generated, comprising target coordinates TC(x,y,z), relative to a first position P1(x,y,z). Further, a second information unit INFO2 is generated associated with the first information unit INFO1. Preferably, the second information unit INFO2 is a naming or categorization of the first information unit INFO1. After the process step s610 follows a process step s615.

In the process step s615 the first information unit INFO1 and the second information unit INFO2 are stored. After the process step s615 follows a process step s620.

In the process step s620 the first information unit INFO1 is transferred from the first unit 111 to the second unit 112, unit 140, or another suitable unit within the military unit which can use the information for implementing of displaying processes and fighting of the target. The transfer can occur after a request from the receiving unit (the second unit 112, the unit 140, or another suitable unit within the military unit). The request can first be matched against the content in the second information unit INFO2. Alternatively, the first information unit INFO1 is transferred automatically to the receiving unit via the central unit 100. After the process step s620 follows a process step s625.

In the process step s625 the first information unit INFO2 and the second information unit INFO2 are implemented in the receiving unit, e.g., in the computer unit 10 existing with the receiving unit. With implementation it is meant that the target coordinates YC(x,y,z) are calculated relative to a position P2(x,y,z), which position is the receiving unit's position. According to an embodiment the target's position can be illustrated visually in a sight existing with the second unit. This will be described in further detail with reference to FIG. 6c. After the process step s625 follows a process step s630.

In the process step s630 the target is localized with help of a picture which is updated in real time which is created depending upon the first information unit INFO1. According to an embodiment the target is localized even depending on the second information unit INFO2. After the process step s630 follows a process step 635.

In the process step s625 the localized target is fought with weapons existing with the receiving unit. After the process step s635 follows a process step 640.

In the process step s640 information comprising the first information unit INFO1 and/or the second information unit INFO2 of the receiving unit is updated through a reporting of how the target is entirely or partially fought. This updated information can even be communicated to the central unit 100 for storing or distribution to other units within the military unit. After the process step s640 the process is concluded.

Figure 6C:
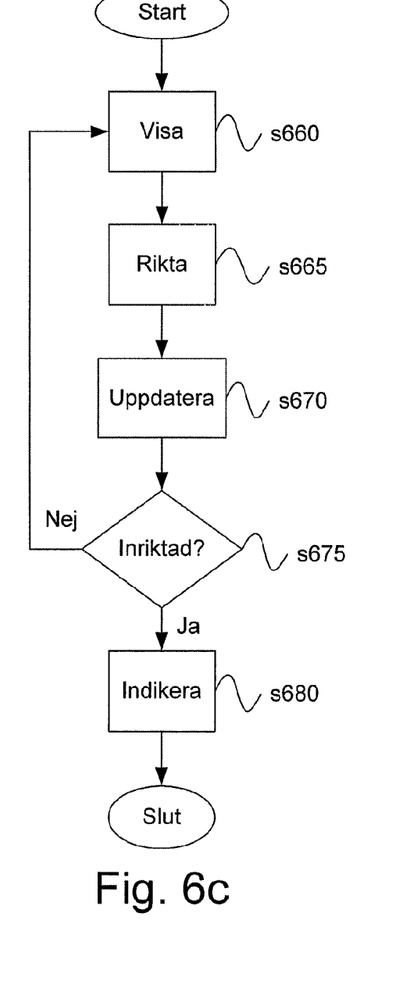
FIG. 6c shows a flow diagram which schematically illustrates a process for displaying an enemy target according to an embodiment of the invention.

FIG. 6c shows a flow chart which schematically represents a process for displaying according to an embodiment of the invention.

After start the process step s660 is performed. In the process step s660 a picture is shown in the sight 8 which is generated by the electronic module 64 based on information INFO1 and/or INFO2. At least one marking indicates in which direction the weapon should be pointed in order to be pointed toward the target. After the process step s660 follows a process step s665.

In the process step s665 the weapon is pointed in a direction which is closer to an optimal target direction. This happens depending upon the picture shown and, in particular, the indication of which direction the weapon should be pointed. After the process step s665 follows a process step s670.

In the process step s670 the picture shown in the sight is updated so that, in that way, an updated indication of the optimized target direction is provided. After the process step s670 follows a process step s675.

In the process step s675 a control of weather the weapon's present direction coincides with the optimized target direction or not is made. If it is not the case, that is, no, the process returns to the process step s660. If it is the case, that is, yes, a process step s680 follows.

In the process step s680 it is indicated that the weapon's direction coincides with the optimized target direction. If the weapon is now discharged the target can be completely or partially fought. According to an aspect of the invention, the process is concluded with a process step wherein reporting of whether the target is fought or nor, or to what degree the target is fought, is done. After the process step s680 the method is concluded.

Figure 7:
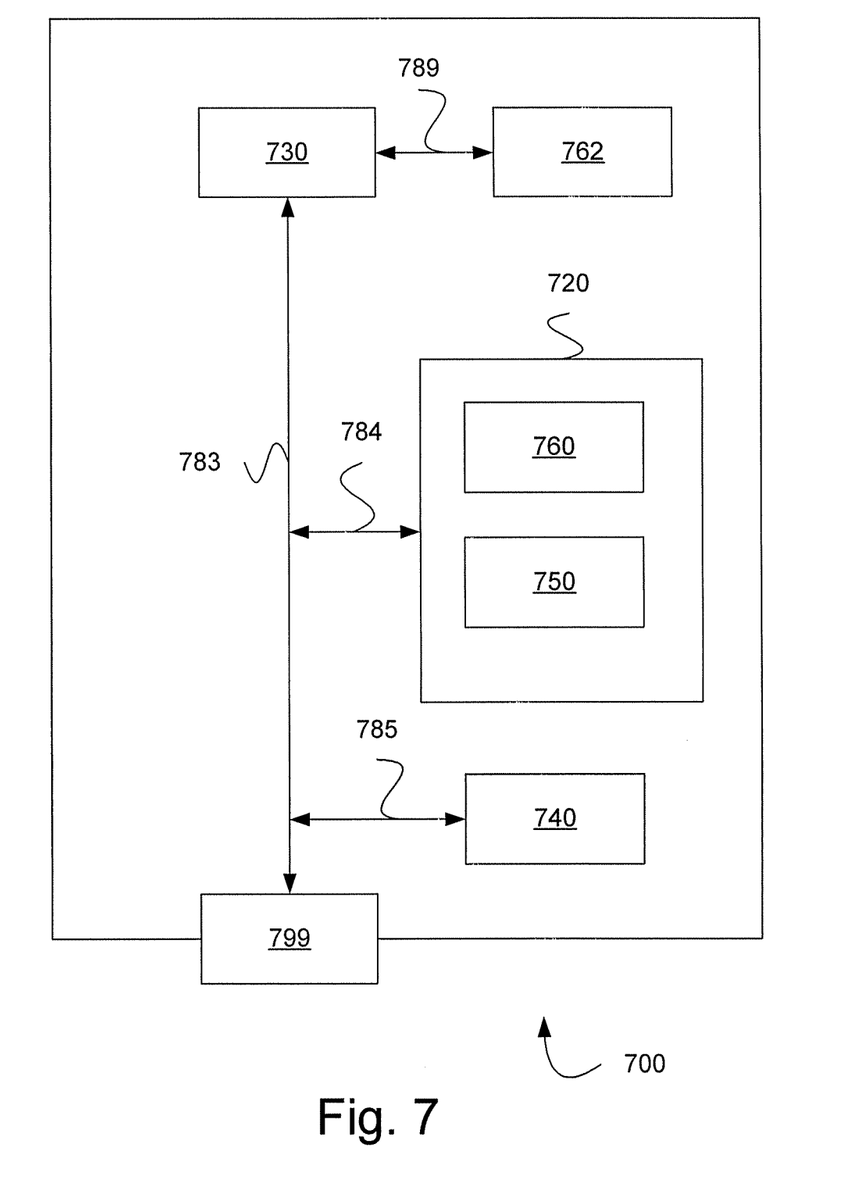
FIG. 7 schematically shows an apparatus which is used according to an embodiment of the invention.

FIG. 7 schematically shows an apparatus 700, according to an aspect of the invention, comprising a non-volatile memory 720, a processor 730 and read-write memory 740. The processor 730 is even called computer processing unit. The memory 720 has a first memory part 750, in which a computer program for directing of the apparatus 700 is stored. The computer program in the memory part 750 for controlling the apparatus 700 can be an operating system. The apparatus 700 can exist in respective units in the military unit, e.g., the first and second combat units 111, 112 (computer unit 10), the central unit 100, the unit 140, etc.

The memory 720 also has a second memory part 760, in which a program for controlling diverse functions is stored. The functions can be, e.g., phase analysis for generating a northerly direction, determining of target coordinates, implementing of displaying process as well as other functions described above.

In an alternative embodiment, the program for controlling the diverse functions are stored in a separate non-volatile computer storage medium 762, such as a replaceable semiconductor memory. The non-volatile computer storage medium 762 is even called non-volatile recording medium 762. The program can be stored in an executable form or in a compressed state.

When it is described in the following that the computer processor unit 730 runs a special function it should be apparent that the computer processor unit 730 runs a special part of the program, which is stored in the memory 720 or a special part of the program, which is stored in the non-volatile recording medium 762.

The computer processor unit 730 is adapted for communication with the memory 720 by means of a data bus 784 and 783. The computer processing unit 730 is also adapted for communication with write memory 740 by means of a data bus 785 and 783. Further, the computer processor unit 730 is adapted for communication with the non-volatile recording medium 762 by means of a data bus 789. The computer processor unit 730 is even adapted for communication with a data port 799 by means of the data bus 783. The apparatus 700 can communicate with the outside, the second 124 through the data port 799.

Different methods can be performed by the apparatus 700 through that it runs the program, which is stored in the non-volatile memory 720 or the program, which is stored in the non-volatile recordable memory 762.

The computer unit 10 is arranged to receive a signal generated depending on, e.g., drawing out of a pin existing in the control module 7, wherein memory in the apparatus 700 is deleted or destroyed as well as recovery becomes impossible in order to be able to use at least some of the equipment units described with reference to FIG. 1b. This can be performed in situations when, e.g., a soldier 111 is removed from fighting condition. The signal can even be generated automatically with detection of e.g., a certain low blood pressure value for the soldier or absence of a heart frequency. The computer unit 10 is arranged to in these cases automatically send status information to the central unit 100 before recovery is made impossible.

The above description of embodiments according to the present invention has been made in the spirit of illustration and description. It is not intended to be complete or to limit the invention to the exact forms that are described. Obviously more modifications and variations will be manifest for a skilled person. The embodiments are chosen and described to best explain the principles of the invention and their practical applications, and in that way make it possible for other skilled workers to understand the invention for different embodiments and with the different modifications which are suitable for the particular use which is intended.

The invention claimed is:

1. A system suitable for displaying a target to a soldier, said system comprising:
   a first unit being arranged to generate a first information unit comprising the position of the target relative to a first position, the first unit comprising a display configured to display to the soldier the first information unit, and
   a second unit existing at a second position, which second position is separate from the first position,
   wherein the first unit and the second unit are arranged for communication with each other via a link, wherein said first unit is arranged to transfer said first information unit from the first unit to the second unit, wherein the second unit is arranged to generate a second information unit comprising the position of the target relative to the second position, depending on the first information unit, wherein the second unit is arranged to indicate the position of the target to allow localization of the target, and wherein the first unit is arranged to generate at least a part of the first information unit by way of voice command, wherein the first information unit comprises information on a type of target or designation of the target for simple identification, and wherein the second unit is arranged to visually indicate a direction to the target.

2. The system for displaying a target according to claim 1, wherein the second unit is arranged to fight the target after the localization.

3. A method for displaying a target to a soldier, said method comprising:

generating in a first unit a first information unit comprising the position of the target relative to a first position, wherein first unit is configured to generate at least a part of the first information unit by way of voice command, transferring said first information unit from the first unit to a second unit arranged at a second position separate from the first position, generating with the second unit a second information unit comprising the position of the target relative to the second position, depending on the first information unit, indicating with the second unit the position of the target to allow localization of the target, and displaying to the soldier the first information unit on a display of the first unit, wherein a type of target or designation of the target for identification and direction to the target is visually indicated.

* * * * *

UNITED STATES PATENT AND TRADEMARK OFFICE
CERTIFICATE OF CORRECTION

| | | |
|---|---|---|
| PATENT NO. | : 8,624,781 B2 | Page 1 of 1 |
| APPLICATION NO. | : 11/921046 | |
| DATED | : January 7, 2014 | |
| INVENTOR(S) | : Christensen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1683 days.

Signed and Sealed this
Twelfth Day of May, 2015

Michelle K. Lee
*Director of the United States Patent and Trademark Office*